United States Patent [19]
Floryan

[11] 3,988,298
[45] Oct. 26, 1976

[54] CATALYST REMOVAL FROM POLYPHENYLENE OXIDES BY AMMONIA AND CARBON DIOXIDE

[75] Inventor: Daniel Edwin Floryan, Glenmont, N.Y.

[73] Assignee: General Electric, Pittsfield, Mass.

[22] Filed: May 12, 1975

[21] Appl. No.: 576,678

[52] U.S. Cl. .......................................... 260/47 ET
[51] Int. Cl.² ........................................ C08G 65/44
[58] Field of Search ............................... 260/47 ET

[56] References Cited
UNITED STATES PATENTS

| | | | |
|---|---|---|---|
| 3,220,979 | 11/1965 | McNelis | 260/47 ET |
| 3,630,995 | 12/1971 | Modan | 260/47 ET |
| 3,733,301 | 5/1973 | Modan | 260/47 ET |
| 3,783,147 | 1/1974 | Calicchia | 260/47 ET |

*Primary Examiner*—Paul R. Michl
*Attorney, Agent, or Firm*—William F. Mufatti; Edward A. Hedman

[57] ABSTRACT

This invention provides a novel method for the removal of the catalyst from a polyphenylene oxide polymerization mixture. The novel method is based on the discovery that ammonia and carbon dioxide may be employed to extract the catalyst from a polyphenylene ether reaction mixture.

12 Claims, No Drawings

CATALYST REMOVAL FROM POLYPHENYLENE OXIDES BY AMMONIA AND CARBON DIOXIDE

This application discloses a novel method for the removal of the catalyst from a polyphenylene ether reaction mixture. The invention is based on the use of ammonia and carbon dioxide for the extraction of the catalyst.

BACKGROUND OF THE INVENTION

The polyphenylene ethers and processes for their preparation are well known in the art. They are described in Hay, U.S. Pat. Nos. 3,306,874 and 3,306,875 and Blanchard et al, U.S. Pat. Nos. 3,219,625 and 3,219,626, all of which are incorporated by reference. Other patents which show the preparation of polyphenylene ethers include Price et al, U.S. Pat. No. 3,382,212 and Kobayshi et al, U.S. Pat. No. 3,455,880 which are also incorporated by reference.

The processes most generally used to produce the polyphenylene ethers involve the self-condensation of a monovalent phenol in the presence of an oxygen-containing gas and a catalyst comprising a metal-amine complex.

These reactions are usually carried out in the presence of an organic solvent and the reaction is ordinarily terminated by removal of the catalyst from the reaction mixture. In the past, this has been done by the use of aqueous solutions of acetic acid, sulfuric acid, chelating agents such as glycine, nitrilotriacetic acid or its sodium salts. Also in Calicchia et al, U.S. Pat. No. 3,783,147, there was disclosed the use of carbon dioxide in an aqueous extraction solution (carbonic acid) for the separation of the copper-amine catalyst residue from a polyphenylene ether polymerization mixture.

The purpose of extraction of polyphenylene ether solutions with $CO_2$ (aqueous carbonic acid) is to remove both the amine and copper components of the catalyst, but $CO_2$ is most effective in removing the amine only. Since copper carbonate has limited solubility in water it has a tendency to precipitate resulting in unacceptably high levels of residual copper in the polyphenylene ether.

The use of ammonia and $CO_2$ as an extraction agent allows the use of low levels of $CO_2$ to give effective removal of the copper primarily. The amine is left largely in the organic phase to be recovered with the solvent. Alternately, large amounts of $CO_2$ may be used with small amounts of ammonia to give more effective removal of copper and still effectively remove the amine. The use of ammonia with $CO_2$ is therefore an improvement over $CO_2$ alone in that it provides improved removal of copper.

It has been found that the use of an aqueous carbon dioxide-ammonia extraction feed results in more than an additive effect from the use of ammonia, as the use of aqueous ammonia or aqueous carbon dioxide alone provides a polymer having substantially higher residues of copper than is obtainable when these materials are used in combination.

Accordingly, it is a primary object of this invention to provide an improved process for the separation of a copper-amine catalyst from a polyphenylene ether reaction mixture.

It is also an object of this invention to provide an improved process for the separation of a copper-amine catalyst from a polyphenylene ether reaction that may be carried out in a continuous manner.

It is also an object of this invention to provide an efficient liquid-liquid extraction system to remove copper-amine catalyst residues.

DETAILED DESCRIPTION OF THE INVENTION

This invention provides a process for forming a polyphenylene ether resin by an oxidative coupling reaction in the presence of a complex copper-amine catalyst comprising passing an oxygen containing gas through a reaction solution of a phenol and said catalyst, the improvement which comprises separating said catalyst by contacting the reaction solution with an aqueous solution of carbon dioxide and ammonia and thereafter separating the polyphenylene ether resin from the reaction mixture.

The preferred polyphenylene ether resins are selected from the formula:

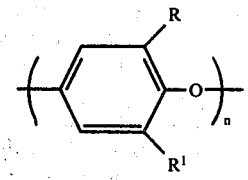

wherein the oxygen ether atom of one unit is connected to the benzene nucleus of the next adjoining unit, n is an integer of at least 50; and R and $R^1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus, said substituents being free of a tertiary carbon atom.

The preferred polyphenylene ether resin is poly(2,6-dimethyl-1,4-phenylene ether).

The present invention may be practiced by adding a solution of ammonia to a reaction mixture of a polyphenylene ether resin containing a copper-amine catalyst and thereafter bubbling carbon dioxide gas through the combined mixture. Also, one may prepare a solution of ammonia that contains from 0.1 to 20% w/w of ammonia and is saturated with carbon dioxide. For the most efficient operation, it is preferred to sparge the gaseous carbon dioxide into a mixture of the polyphenylene oxide reaction solution and aqueous ammonia.

The role of ammonia in improving copper removal is believed to operate by increasing copper solubility in the aqueous extract through formation of a more soluble copper-ammonia complex, which forms a deep blue-colored aqueous solution. The most stable complex is a 4:1 molar ratio of ammonia to copper and this is a likely lower limit of ammonia use, although repeated extractions with less ammonia will be as effective. There is no upper limit of ammonia use, but at levels above 50:1 ammonia to copper there is probably little improvement. Usually a ratio of 10:1 to 30:1 may be employed.

The polyphenylene reaction mixture may be contacted with an aqueous solution that contains a mole ratio of from 1:100 to 20:1 of ammonia to carbon dioxide. The preferred mole ratio is from 1:10 to 10:1 and the especially preferred ratio is 5:1 to 1:1. In carrying out the invention, it is preferred to employ the aqueous carbon dioxide and ammonia solution at a volume ratio of aqueous carbon dioxide and ammonia solution to polyphenylene ether reaction mixture of from 0.0005:1 to 50:1.

The preferred manner of practicing the invention is through multiple extractions of the polyphenylene ether solutions, either in a batchwise manner or in continuous manner is by a countercurrent extraction apparatus. This is because ammonia competes with the amine for the copper portion of the catalyst, so that multiple extractions at low levels of ammonia to copper are generally more effective than a single extraction at high ammonia to copper level.

If the process of the invention is carried out continuously, a suitable column is used in which the polymer solution is fed from the bottom and the aqueous ammonia and carbon dioxide solution is fed countercurrently from the top. As stated hereinabove, the carbon dioxide may be sparged directly into the column in which case it would be preferred to feed the carbon dioxide into the bottom of the column. After separation of the aqueous extraction solution, the polyphenylene ether may be separated according to standard techniques.

DESCRIPTION OF THE PREFERRED EMBODIMENTS

EXAMPLE 1

To a one liter resin reactor fitted with a stainless steel cooling coil and a high speed agitator was added 500 ml of toluene and 10.9 g of di-n-butyl amine. A solution of 0.25 g cupric chloride ($CuCl_2$) and 0.39 g sodium bromide ($NaBr$) in four milliters of methanol was added to the reactor from a beaker, followed by two milliliters of methanol as a rinse. Oxygen was added through a dip tube in the reactor at a rate of 170 cc/min. and a solution of 2,6-xylenol (70 g in 83 ml of toluene) was added slowly over 15 minutes through a dropping funnel. Temperature was maintained at 30° C throughout the polymerization. After 120 minutes from the start of 2,6-xylenol addition oxygen addition was ended. The polymer solution was quite viscous and a later determination of intrinsic viscosity showed 0.52 dl/g.

To this solution was added 10 volume % water containing 0.32% by weight of ammonia, sufficient to give an ammonia to copper ratio of 10:1. $CO_2$ was bubbled into the solution with stirring for 10 minutes at a rate of 1 SCFH (472 cc/min). (This gave an ammonia to $CO_2$ molar ratio of about 1:10). After addition of the $CO_2$ the aqueous phase was separated and the polymer solution extracted again in the same way three more times, after which a fourth extraction without the ammonia was conducted. The polymer was isolated by methanol precipitation to give a residual copper level of 7.5 ppm.

The aqueous ammonia-$CO_2$ extracts were analyzed for copper and dibutyl amine and showed that 99.8% of the copper had been recovered and 90% of the dibutyl amine had been recovered.

CONTROL EXAMPLE 1

A polymer solution prepared as in Example 1 was extracted five times with aqueous $CO_2$ alone. (150 cc polymer solution, 40 ml/min $CO_2$ flow for five minutes with stirring). The polymer solution was then extracted once with aqueous acetic acid. All of the aqueous extracts were analyzed for dibutyl amine, but that 75% of the copper which was recovered was only extracted by the acetic acid, with the majority of copper forming an insoluble precipitate (~70%).

CONTROL EXAMPLE 2

In a repeat of Control Example 1, using polymer solution prepared as in Example 1, but without a final acetic acid wash, $CO_2$ extracted polymer solution (500 cc extracted four times with $CO_2$ at 742 ml/min for 10 minutes, with 10 volume % water added) was precipitated to give a polyphenylene ether containing 108 ppm copper.

CONTROL EXAMPLE 3

A polymer solution prepared as in Example 1 was extracted five times with 10% ammonia at a molar ratio of 10:1 ammonia to copper. On precipitation the polyphenylene ether was found to contain 136 ppm Cu. The ammonia extracts contained only 7% of the dibutyl amine.

EXAMPLE 2

Polymer solutions prepared as in Example 1 were extracted once with 5% ammonia solution (by weight) at a level sufficient to give 30:1 molar ratio of ammonia to copper. Various amounts of $CO_2$ were added to give ammonia to $CO_2$ ratios as shown below. On precipitation of the polyphenylene ether residual copper levels were determined as shown below, and the amount of dibutyl amine extracted was monitored.

| $NH_3:CO_2$ Molar Ratio | PPM Copper | Wt % DBA Extracted |
|---|---|---|
| 3:1 | 50 | 3 |
| 4:1 | 46 | 20 |
| 1:1 | 45 | 18 |

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. In a process for forming a polyphenylene ether resin by an oxidative coupling reaction in the presence of a complex copper-amine catalyst comprising passing an oxygen-containing gas through a reaction solution of a phenol and said catalyst, the improvement which comprises separating said catalyst by contacting the reaction solution with an aqueous solution of carbon dioxide and ammonia and thereafter separating the polyphenylene ether resin from the reaction mixture.

2. A process as defined in claim 1 wherein said polyphenylene ether is selected from the formula:

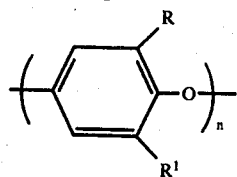

wherein the oxygen ether atom of one unit is connected to the benzene nucleus of the next adjoining unit, n is an integer of at least 50; and R and R$^1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

3. A process as defined in claim 2 wherein said polyphenylene ether is poly(2,6-dimethyl-1,4-phenylene ether).

4. A process as defined in claim 2 wherein the aqueous solution of carbon dioxide and ammonia contains a mole ratio of at least 4:1 of ammonia to the amount of copper being extracted.

5. A process as defined in claim 4 wherein the aqueous solution of carbon dioxide and ammonia contains a mole ratio of 1:100 to 20:1 of ammonia to carbon dioxide.

6. A process as defined in claim 4 wherein the aqueous solution of carbon dioxide and ammonia contains a mole ratio of 5:1 to 1:1 of ammonia to carbon dioxide.

7. A process as defined in claim 4 wherein carbon dioxide is continuously sparged into the aqueous solution.

8. A process as defined in claim 1 which is carried out batchwise.

9. A process as defined in claim 1 which is carried out continuously.

10. In a process for forming a polyphenylene ether resin by an oxidative coupling reaction in the presence of a copper-amine catalyst comprising passing an oxygen-containing gas through a reaction solution containing 2,6-xylenol and said catalyst, the improvement which comprises contacting the reaction solution with an aqueous solution of ammonia and carbon dioxide; separating the aqueous solution of ammonia, carbon dioxide and catalyst from the reaction solution; and thereafter recovering the poly(2,6-dimethyl-1,4-phenylene ether) by adding an antisolvent for the poly(2,6-dimethyl-1,4-phenylene ether) to the reaction solution.

11. A process as defined in claim 9 wherein the reaction solution contains toluene and the antisolvent is methanol.

12. In a process for forming a polyphenylene ether resin by an oxidative coupling reaction in the presence of a cupric-amine catalyst comprising passing oxygen through a reaction solution containing 2,6-xylenol and said catalyst, the improvement which comprises contacting the reaction solution with an aqueous solution of ammonia and carbon dioxide that contains a mole ratio of 5:1 to 1:1 of ammonia to carbon dioxide and a mole ratio of 4:1 of ammonia to the amount of copper being extracted; separating the aqueous solution of ammonia, carbon dioxide and catalyst from the reaction solution; and thereafter recovering the poly(2,6-dimethyl-1,4-phenylene ether) by adding an antisolvent for the poly(2,6-dimethyl-1,4-phenylene ether) to the reaction solution.

* * * * *